(12) United States Patent
Lu et al.

(10) Patent No.: US 11,689,054 B2
(45) Date of Patent: Jun. 27, 2023

(54) WIRELESS CHARGING MOUSE

(71) Applicants: DEXIN ELECTRONIC LTD., Guangdong (CN); DEXIN CORPORATION, New Taipei (TW)

(72) Inventors: Ho-Lung Lu, New Taipei (TW); Ching-Tsun Hong, New Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 410 days.

(21) Appl. No.: 17/007,983

(22) Filed: Aug. 31, 2020

(65) Prior Publication Data

US 2020/0403446 A1 Dec. 24, 2020

Related U.S. Application Data

(63) Continuation-in-part of application No. 16/046,662, filed on Jul. 26, 2018, now abandoned.

(30) Foreign Application Priority Data

Feb. 9, 2018 (TW) .................................. 107104736

(51) Int. Cl.
| | |
|---|---|
| *H01M 10/46* | (2006.01) |
| *H02J 50/10* | (2016.01) |
| *B29C 45/14* | (2006.01) |
| *G06F 3/0354* | (2013.01) |
| *H02J 7/00* | (2006.01) |
| *B29L 31/34* | (2006.01) |

(52) U.S. Cl.
CPC ........ *H02J 50/10* (2016.02); *B29C 45/14819* (2013.01); *G06F 3/03543* (2013.01); *H02J 7/0042* (2013.01); *B29L 2031/3481* (2013.01)

(58) Field of Classification Search
CPC ...... H02J 7/0042; H02J 7/0044; H02J 50/005; H02J 50/10; B29C 45/14819; G06F 3/03543; B29L 2031/3481
USPC .................................. 320/107, 108, 114, 115
See application file for complete search history.

(56) References Cited

U.S. PATENT DOCUMENTS

| | | | |
|---|---|---|---|
| 2003/0048254 A1* | 3/2003 | Huang | G06F 3/039 345/158 |
| 2013/0093388 A1* | 4/2013 | Partovi | H02J 50/10 320/108 |
| 2013/0113422 A1* | 5/2013 | Lee | H01Q 1/526 320/108 |
| 2017/0248999 A1* | 8/2017 | Ng | H01R 31/06 |

\* cited by examiner

*Primary Examiner* — Edward Tso

(74) *Attorney, Agent, or Firm* — Li & Cai Intellectual Property (USA) Office

(57) ABSTRACT

A wireless charging mouse includes an upper housing, a lower housing, and a coil board. The lower housing is fixed to the upper housing and has an aperture for exposing a displacement sensing module. The coil board is integrally embedded in the lower housing by means of injection molding such that the coil board and the lower housing are formed as a one-piece structure.

5 Claims, 5 Drawing Sheets

WIRELESS CHARGING MOUSE

CROSS-REFERENCE TO RELATED PATENT APPLICATION

This Application is a Continuation-in-Part of application Ser. No. 16/046,662 filed Jul. 26, 2018, and entitled wireless charging mouse.

BACKGROUND

1. Technical Field

The instant disclosure relates to a wireless charging mouse, and in particular, to a wireless charging mouse having a coil board internally embedded within a lower housing of the mouse.

2. Description of Related Art

In today's world of ever advancing technology, personal computers, laptops, tablets, and portable devices of different sizes have become irreplaceable tools in people's lives, and mouses are common input devices for the abovementioned equipment. Further, the wireless charging mouse has gradually been adopted by people because of the convenience of wireless charging. However, the existing design of the wireless charging mouse places the coil board on the lower housing of the mouse in a stacked manner, thus creating a stack height. This design not only occupies the internal space of the mouse, but also causes the coil board of the mouse to be easily damaged during assembly, thereby increasing the defect rate during assembly of the mouse.

In this regard, the present disclosure provides a solution to overcome the aforementioned drawbacks.

SUMMARY

The object of the present invention is to provide a wireless charging mouse that can overcome the aforementioned drawbacks.

In order to achieve the object above, one of the embodiments of the instant disclosure provides a wireless charging mouse including an upper housing, a lower housing, and a coil board. The lower housing is fixed to the upper housing and has an aperture for exposing a displacement sensing module. The coil board is integrally embedded in the lower housing.

Preferably, the coil board is completely enclosed in the lower housing.

Preferably, the coil board is partially enclosed in the lower housing.

Preferably, the coil board is sized and shaped to correspond to the lower housing.

Preferably, the coil board has a plate board and a coil formed on the plate board.

Preferably, the plate board has an opening and a plurality of positioning portions extending from a periphery of the opening.

Preferably, the plate board is provided with a plurality of positioning notches recessed from the periphery of the opening.

Preferably, the plate board is made of a polyimide material.

Preferably, the coil is an irregularly shaped coil.

For the wireless charging mouse provided by the embodiment of the present invention, the coil board is embedded in the lower housing of the mouse by means of injection molding. This eliminates the stack height that the coil board may create at the lower housing of the mouse. This design not only does not occupy the internal space of the mouse, but also prevents the coil board of the mouse from being damaged, thereby reducing the defect rate during assembly of the mouse.

In order to further the understanding regarding the present invention, the following embodiments are provided along with illustrations to facilitate the disclosure of the present invention.

DESCRIPTION OF THE EXEMPLARY EMBODIMENTS

Figure 1:
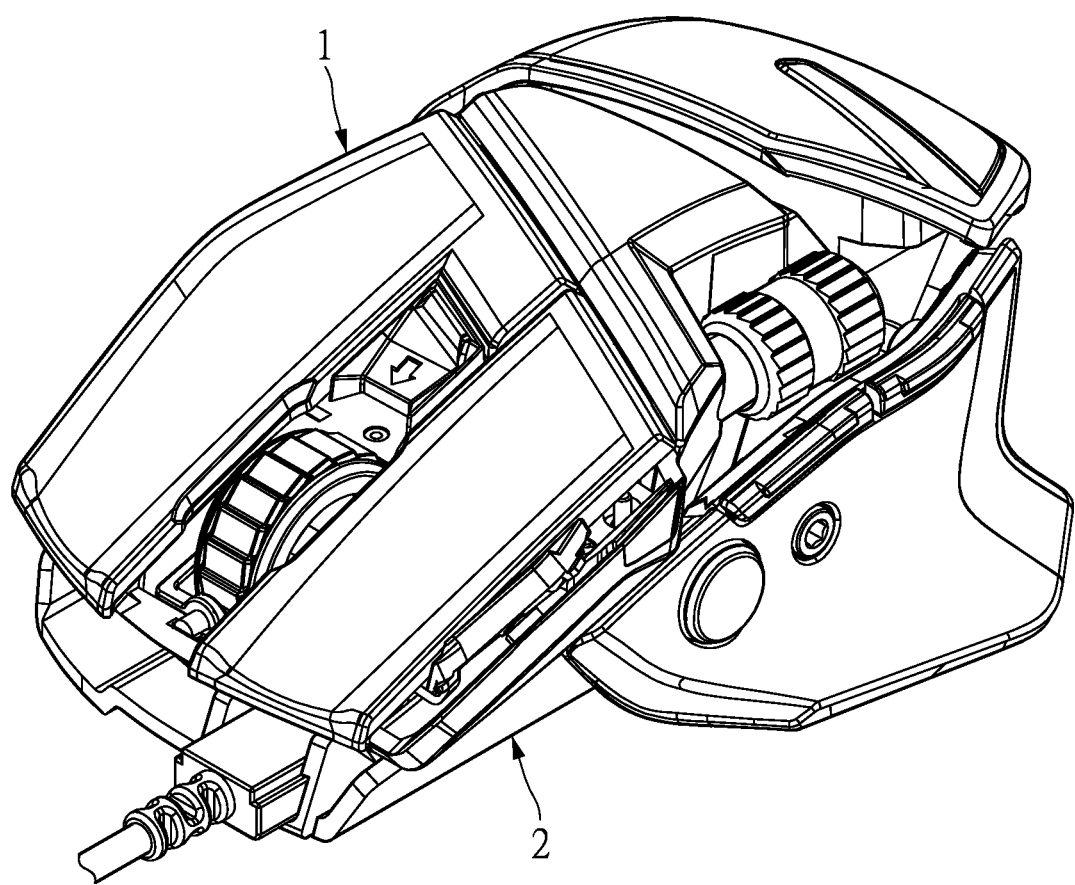
FIG. 1 shows a perspective view of a wireless charging mouse according to the present disclosure.
Figure 2:
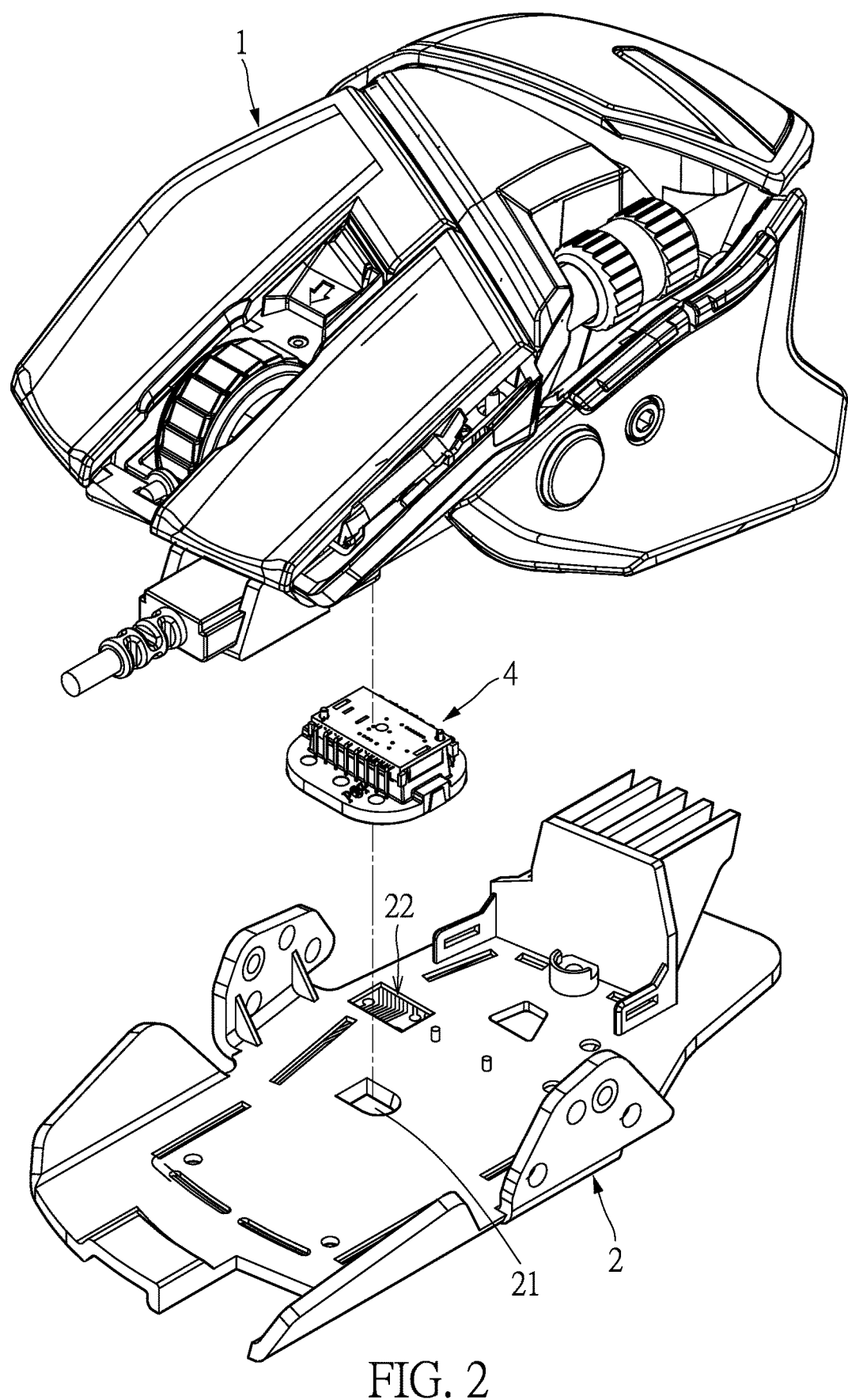
FIG. 2 shows a partially exploded view of a wireless charging mouse according to the present disclosure.
Figure 3:
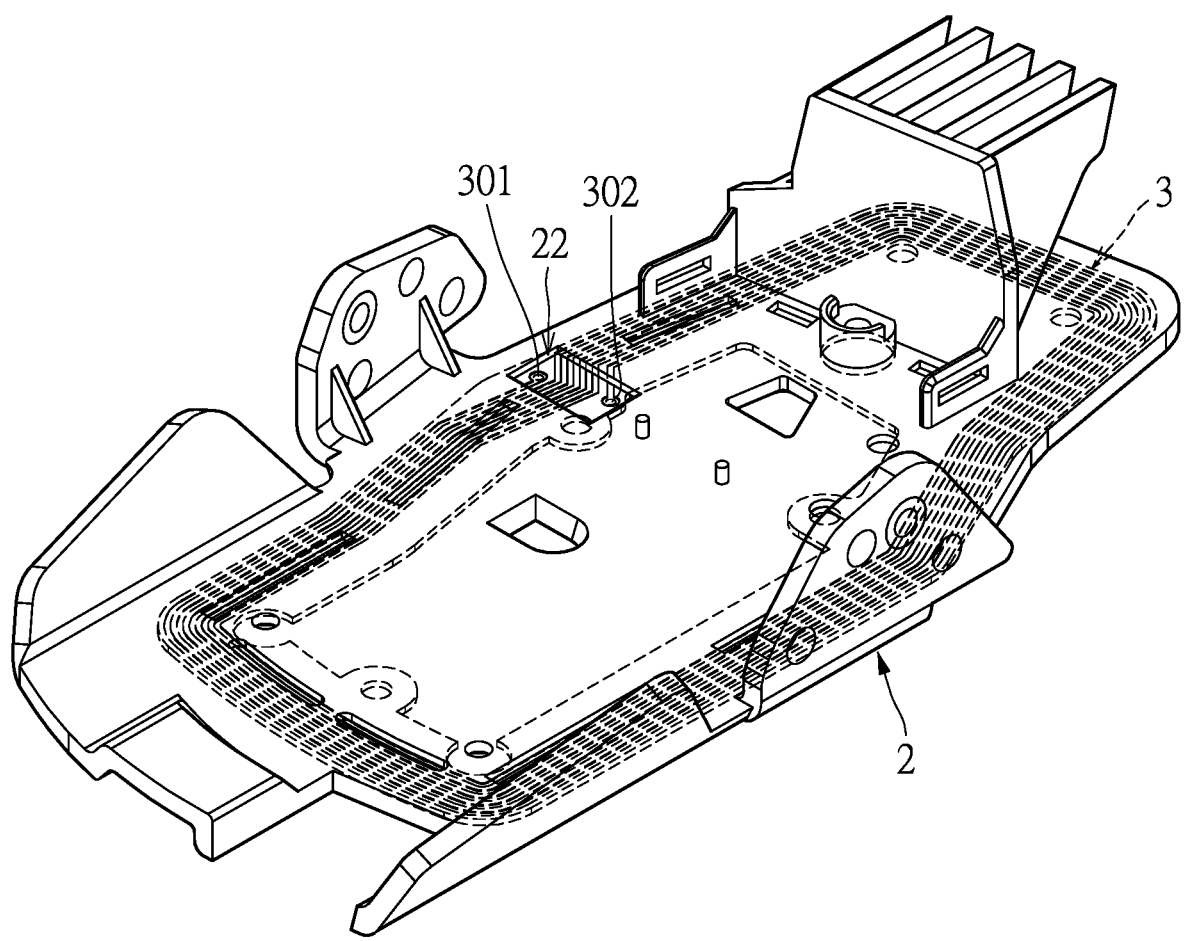
FIG. 3 shows a perspective view of a coil board internally embedded within a lower housing according to the present disclosure.
Figure 4:
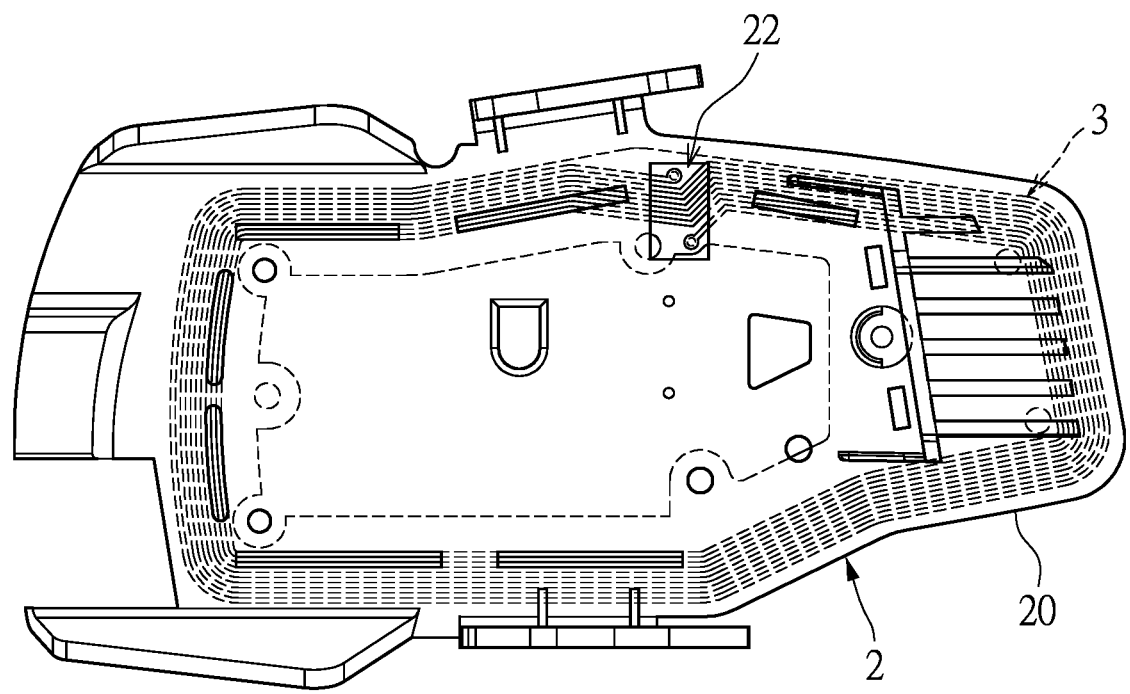
FIG. 4 shows a top view of a coil board internally embedded within a lower housing according to the present disclosure.
Figure 5:
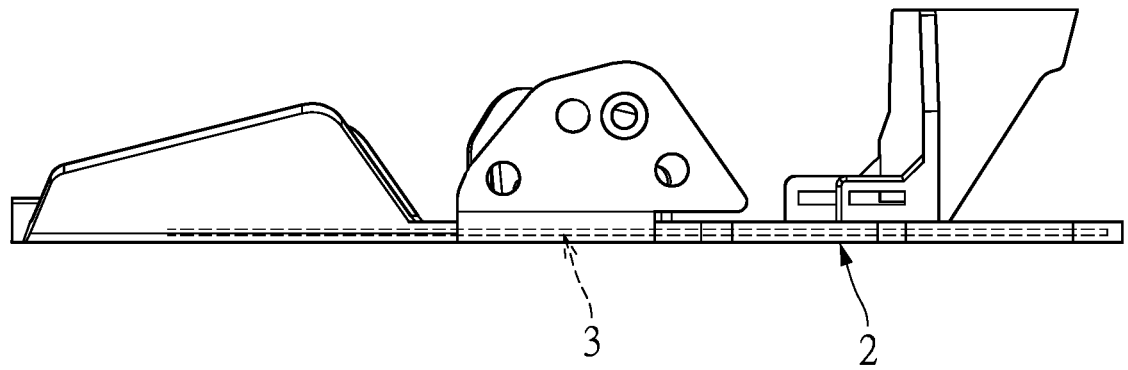
FIG. 5 shows a side view of a coil board internally embedded within a lower housing according to the present disclosure.
Figure 6:
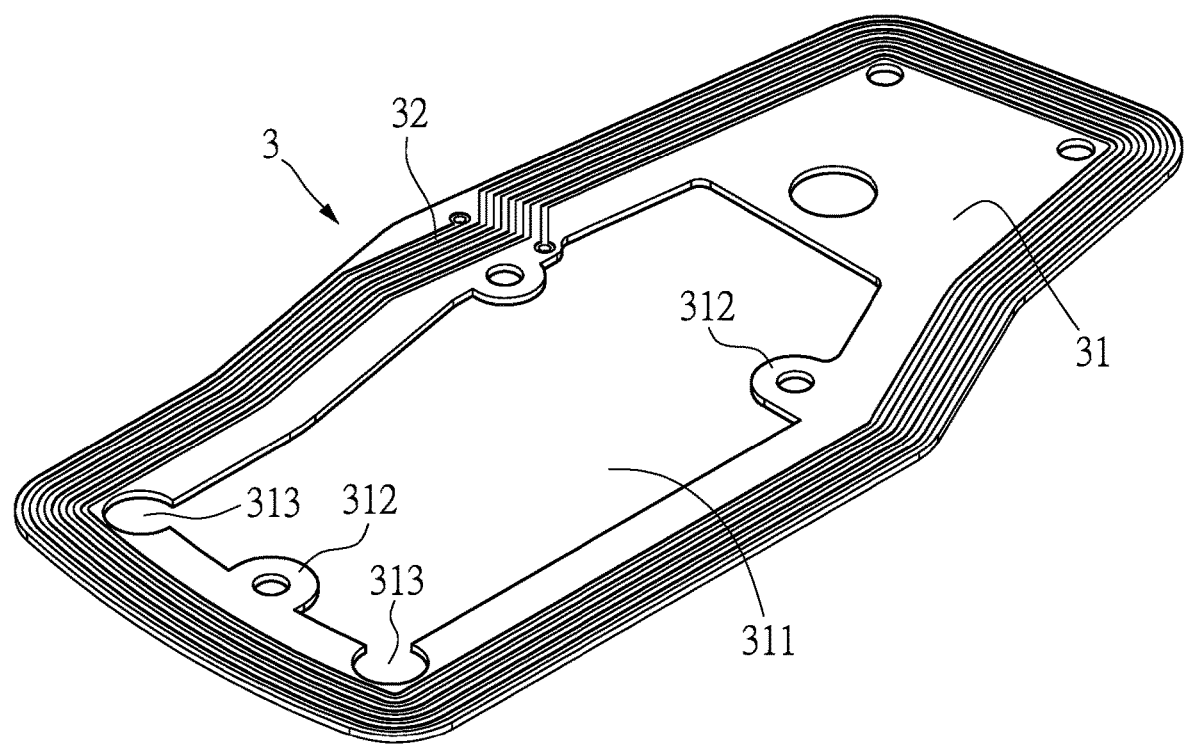
FIG. 6 shows a perspective view of a coil board according to the present disclosure.

The aforementioned illustrations and following detailed descriptions are exemplary for the purpose of further explaining the scope of the present invention. Other objectives and advantages related to the present invention will be illustrated in the subsequent descriptions and appended drawings.

Referring to FIG. 1 to FIG. 7, in one preferred embodiment of the present disclosure, the wireless charging mouse (hereinafter referred to as a mouse) includes an upper housing 1, a lower housing 2, and a coil board 3. It is worth noting that the mouse provided by the present invention further includes other components such as a scroll wheel, buttons, and other elements for controlling the mouse, which are not further detailed herein. Hereinafter, the disclosure will focus on describing what is considered the features of the present invention.

In particular, the lower housing 2 is threadedly fixed to the upper housing 1, and an accommodating space is formed between the upper housing 1 and the lower housing 2 for accommodating the electronic component, such as a displacement sensing module 4. The displacement sensing module 4 is used to determine the moving direction and the moving distance of the mouse, thereby completing the positioning of the cursor. The module may be an optical displacement sensing module or a laser displacement sensing module. The lower housing 2 has an aperture 21 for exposing the displacement sensing module 4 described above.

The coil board 3 is integrally embedded in the lower housing 2. Specifically, the coil board 3 is integrally embedded in the lower housing 2 by means of injection molding, so that the coil board 3 and the lower housing 2 are formed as a one-piece structure. In addition, the coil board 3 may be completely enclosed in the lower housing 2 or may be partially enclosed in the lower housing 2.

In this embodiment, the coil board 3 is partially enclosed in the lower housing 2, and a top surface of the lower housing 2 forms an inspection opening 22 that exposes the terminals 301, 302 of the coil board 3 for testing a short-circuit of the coil board 3. Specifically, the coil board 3 may be short-circuited during the injection molding process. In order to prevent the defect rate during assembly of the mouse, the inspection opening 22 is formed to expose the terminals 301, 302 of the coil board 3 for testing inductance of the coil board 3 and comparing the inductance of the coil board 3 with an average inductance to determine the coil board 3 with the abnormal inductance as the coil board with a short-circuit.

Moreover, the coil board 3 is sized and shaped to correspond to the lower housing 2, namely, the coil board 3 has the coil 32 with an outer contour corresponding to the lower housing 2, so that the magnetic induction effect can be enhanced without sacrificing the internal space of the mouse.

Figure 7:
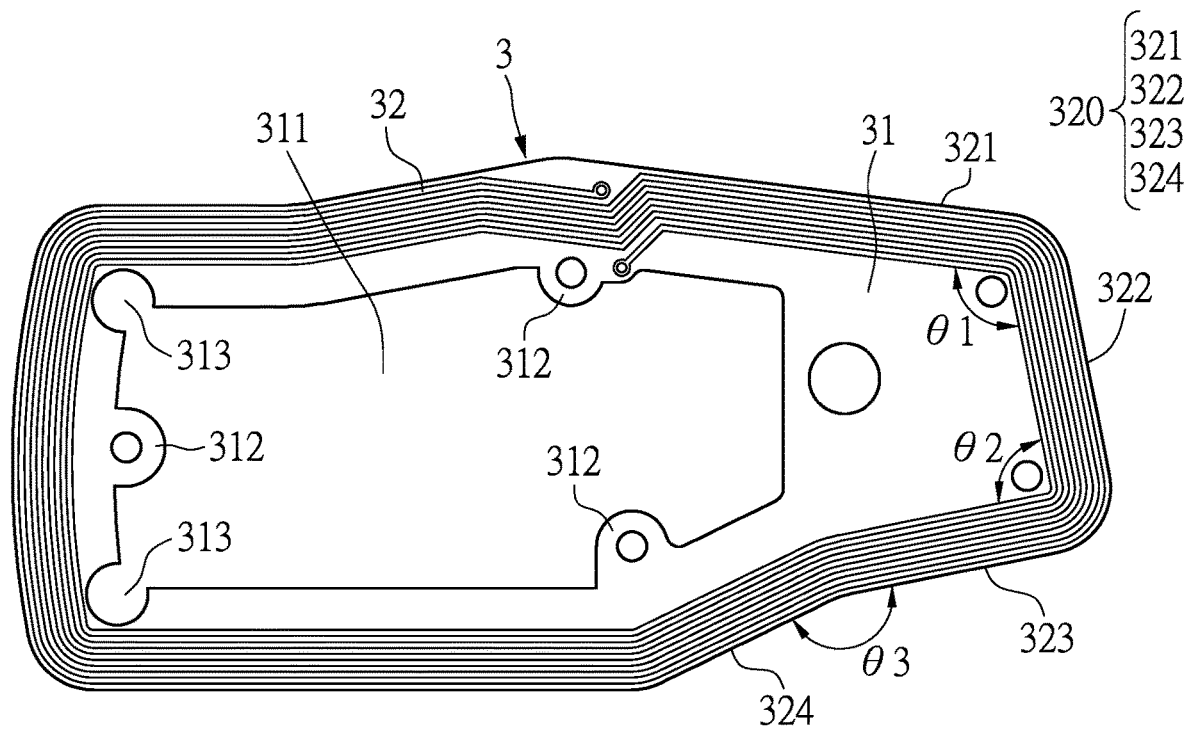
FIG. 7 shows a top view of a coil board according to the present disclosure.

Further, the coil board 3 has a plate board 31 and a coil 32 formed on the plate board 31, and an outer contour of a rear portion 320 of the coil 32 is irregularly shaped the same as an outer contour of a rear portion 20 of the lower housing 2. Furthermore, The rear portion 320 of the coil 32 has a first part 321, a second part 322 connected to the first part 321, a third part 323 connected to the second part 322, and a fourth part 324 connected to the third part 323. An inner side of the first part 321 and an inner side of the second part 322 define a first angle θ1 there-between, the inner side of the second part 322 and an inner side of the third part 323 define a second angle θ2 there-between, and an outer side of the third part 323 and an outer side of the fourth part 324 define a third angle θ3 there-between, as shown in FIG. 7.

In this embodiment, the first angle θ1 is set to be greater than the second angle θ2, and the third angle θ3 is set to be greater than the first angle θ1. Preferably, the first angle θ1 is set to be greater than 90 degrees, the second angle θ2 is set to be less than or equal to 90 degrees, and the third angle θ3 is set to be greater than 90 degrees.

The coil 32 may be a coil formed by etching on a copper-clad plate board 31. The plate board 31 may be a Rigid PCB or a Flexible PCB, and its material is preferably made of Polyimide (PI). The material itself has high thermal stability, with good radiation resistance and heat resistance, and allows processing at temperatures of up to 500° C. As a result, the coil board 3 has good heat resistance, so that the molten plastic material can be directly distributed around the coil board 3 during the injection molding process, and the one-piece structure is formed after solidification.

Moreover, the plate board 31 of the coil board 3 has an opening 311 and a plurality of positioning portions 312 extending from the periphery of the opening 311. The positioning portions 312 can cooperate with the positioning structure to position the plate board 31 in the mold cavity (not shown). After the lower housing 2 is molded in the mold cavity, the lower housing 2 can be integrally combined with the coil board 3. The plate board 31 of the coil board 3 is also provided with a plurality of positioning notches 313 recessed from the periphery of the opening 311. These positioning notches 313 can be fitted with the positioning elements, such as positioning posts, to position the plate board 31 in the lower housing 2 of the mouse.

In addition, the shape of the coil 32 may vary depending on particular implementation. For example, coil 32 may be a circular, rectangular, square, or irregularly shaped coil. In this embodiment, the coil 32 is an irregularly shaped coil to correspond to the contour of the plate board 31.

In summary, the present invention embeds the coil board in the lower housing of the mouse by means of injection molding, instead of placing the coil board in a stacked manner at the lower housing of the mouse as is the conventional method. In this way, the present disclosure can at least provide the following advantages: (1) more effective use of the internal space of the mouse. (2) a stacking height of the coil board in the lower housing of the mouse can be avoided, so that the mouse can be made thinner and shorter. (3) the size of the coil board is adapted to the size of the lower housing of the mouse, and the magnetic induction effect is enhanced. (4) the coil board is hidden in the lower housing of the mouse, so that the coil board is not easily damaged, thereby reducing the defect rate during assembly of the mouse.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A wireless charging mouse, comprising:
   an upper housing;
   a lower housing being fixed to the upper housing and having an aperture for exposing a displacement sensing module; and
   a coil board being integrally embedded in the lower housing by injection molding such that the coil board and the lower housing are formed as a one-piece structure,
   wherein the coil board is partially enclosed in the lower housing, and a top surface of the lower housing forms an inspection opening that exposes terminals of the coil board such that a short circuit testing is done on the terminals on the coil board,
   wherein the coil board has a plate board and a coil formed on the plate board, and an outer contour of a rear portion of the coil is irregularly shaped the same as an outer contour of a rear portion of the lower housing,
   wherein the rear portion of the coil has a first part, a second part connected to the first part, a third part connected to the second part, and a fourth part connected to the third part,
   wherein an inner side of the first part and an inner side of the second part define a first angle there-between, the inner side of the second part and an inner side of the third part define a second angle there-between, and an outer side of the third part and an outer side of the fourth part define a third angle there-between, and wherein the first angle is set to be greater than the second angle, and the third angle is set to be greater than the first angle.

2. The wireless charging mouse according to claim 1, wherein the first angle is set to be greater than 90 degrees, the second angle is set to be less than or equal to 90 degrees, and the third angle is set to be greater than 90 degrees.

3. The wireless charging mouse according to claim 1, wherein the plate board has an opening and a plurality of positioning portions extending from a periphery of the opening.

4. The wireless charging mouse according to claim 3, wherein the plate board is provided with a plurality of positioning notches recessed from the periphery of the opening.

5. The wireless charging mouse according to claim 1, wherein the plate board is made of a polyimide material.

\* \* \* \* \*